S. HELD.
FAUCET.
APPLICATION FILED JAN. 10, 1913.

1,082,154.

Patented Dec. 23, 1913.

Witnesses:—
Arthur Heslep
A. S. Phillips

Inventor:
Siegfried Held
by Chas. C. Tillman
Attorney.

UNITED STATES PATENT OFFICE.

SIEGFRIED HELD, OF CHICAGO, ILLINOIS, ASSIGNOR TO THE HELD COMPANY, OF CHICAGO, ILLINOIS, A CORPORATION OF ILLINOIS.

FAUCET.

1,082,154.  Specification of Letters Patent.  Patented Dec. 23, 1913.

Application filed January 10, 1913. Serial No. 741,184.

*To all whom it may concern:*

Be it known that I, SIEGFRIED HELD, a subject of the Emperor of Austria-Hungary, residing at Chicago, in the county of Cook and State of Illinois, have invented certain new and useful Improvements in Faucets, of which the following is a specification.

This invention relates to improvements in faucets of the self closing type to be used in connection with liquid or water supplying devices or systems, and has for its principal object to provide a self closing faucet, which may be readily substituted for the common faucets in general use, but in which the valve which controls the discharge of liquid will open in the direction in which the liquid pressure is exerted, thereby making the faucet extremely easy to operate and permitting the quantity of liquid discharged to be regulated.

In my application Serial Number 717,728, filed August 29, 1912, for Letters Patent for improvements in faucets, I have shown and described, but not claimed therein, *per se*, a faucet of the same construction as the one herein disclosed and claimed.

Figure 1:
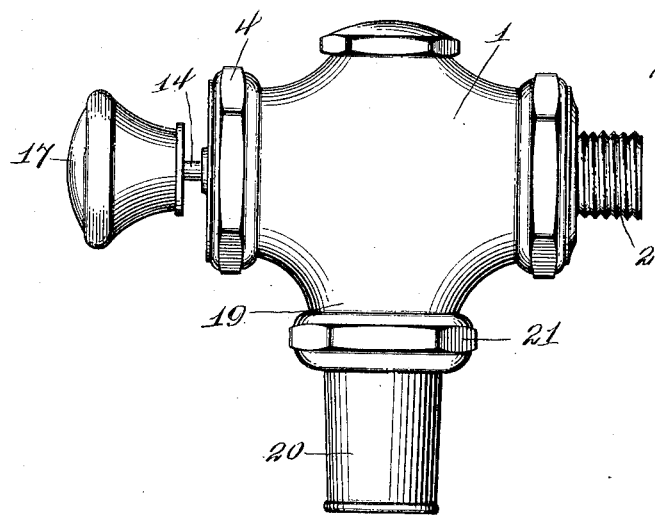
Figure 2:
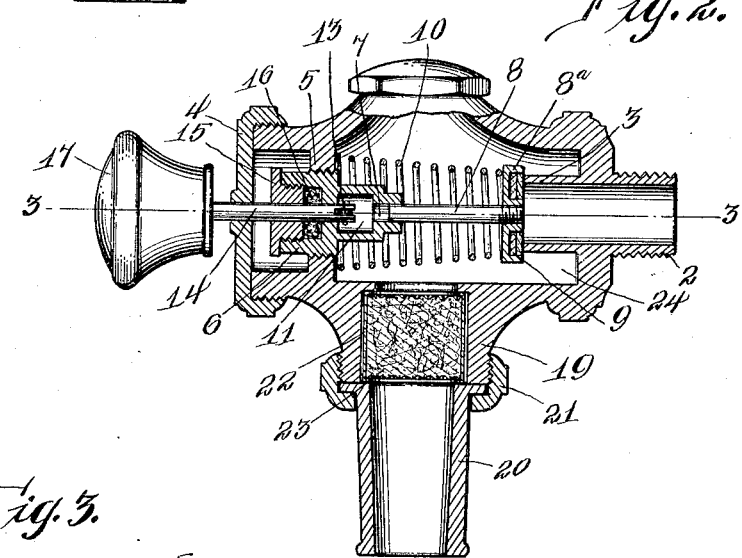
Figure 3:
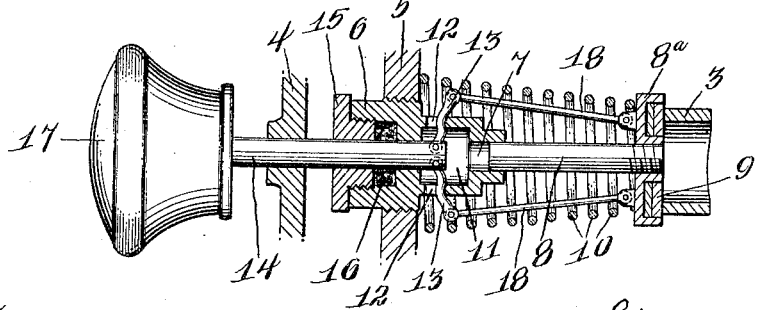

In the accompanying drawing, which serves to illustrate an embodiment of the invention Figure 1 is a side view in elevation of a faucet, embodying my improvements; Fig. 2 is a vertical sectional view through the faucet, and Fig. 3 is an enlarged horizontal section through the faucet taken on line 3—3 of Fig. 2, with parts of the casing broken away.

Like numerals of reference refer to corresponding parts throughout the different views of the drawing.

The faucet consists of a body 1, having a threaded end 2, for attaching the same to any ordinary water or liquid supply pipe, and an inwardly extending tubular extension 3, opposite to and in line with said threaded end. A cap 4 is threaded to the other end of the faucet body.

5 is a wall or partition within the body and substantially parallel to the cap 4. A gland 6 is adapted to be threaded in the wall 5, and is provided at its inner end with a bore 7, in which one end of the valve stem 8 is to slide. The other end of the valve stem is provided with a valve disk $8^a$. A suitable annular packing 9, preferably of rubber or leather, is interposed between the disk $8^a$ and the inner end of the inwardly projecting tubular extension 3.

10 is a spiral spring bearing at one end against the wall 5, and at its other end against the disk $8^a$, thereby tending to keep the latter pressed tightly against the end of the extension 3, which forms the valve seat, so as to cut off the flow of liquid from the piping to which the threaded end 2 may be connected.

A chamber 11 is formed in the gland 6, which chamber has a pair of oppositely disposed openings 12 in its sides. Two levers 13 are rockingly mounted upon the edges of the openings 12, as most clearly shown in Fig. 3, and are adapted to have their inner ends pivoted to a stem 14, which latter passes through bores in the glands 6, the cap 4, and another cap 15, threaded to the gland 6. This gland is provided with suitable packing 16, around the stem 14, and said packing is held in place by the threaded cap 15. A knob 17 is attached to the free outer end of the stem 14, and by means of this knob the stem 14 may be pressed inwardly. Links 18 serve to connect the outer ends of the levers 13 with the valve disk $8^a$. A threaded outlet 19, is formed on the faucet body, preferably at right angles to the entrance pipe 2, and a discharging nozzle 20 is fastened to the outlet 19, by means of a coupling 21, or collar. A filter receptacle 22 is mounted on the faucet body 1, between the nozzle 20 and the interior or cavity 24 of said body, which receptacle is made of wire mesh or cloth and filled with any suitable liquid filtering material.

When water is to be drawn from the faucet, the knob 17 is pressed or pushed toward the faucet body 1, thereby sliding the stem 14 inwardly. Doing so rocks the levers 13 upon the walls of the openings 12, thereby pulling on the links 18, and drawing the valve disk $8^a$ away from the end of the tubular extension 3. Obviously this will allow water to enter the interior of the faucet body, from which it passes through the filtering material 23, and the nozzle 20, in quantities which can be regulated by the amount of pressure applied to the knob 17 so as to withdraw the disk $8^a$ or valve a slight or greater distance from the tubular extension 3, which forms a seat for said disk or valve.

It will be noted that when the faucet is actuated by pressing the knob 17, the valve disk 8ª will move in the same direction in which the water pressure is exerted, thereby tending to force the same against the tension of the spring 10. By thus utilizing the water pressure itself, I am able to produce a faucet which is much easier to open than is possible with the faucets now in common use.

Having thus fully described my invention, what I claim as new and desire to secure by Letters Patent is—

A faucet including a hollow body having at one end thereof a tubular member for the supply of liquid and provided with a discharge outlet, the said tubular member projecting into the cavity of the body, a reciprocal stem mounted on the body and extended therein opposite said tubular member, a hollow member surrounding the inner portion of said stem forming a guide for the latter and provided with a bore, a plurality of rocking levers connected at one of their ends to said stem and extended through said last named member, a stem slidably mounted at one end in the bore of said member, a valve on the other end of said stem and adapted to close the inwardly projecting end of the tubular member, links connecting the rocking levers to said valve, and a spring contacting at one of its ends with the valve and at its other end with the body.

In witness whereof, I have hereunto subscribed my name this 7th day of January 1913, in the presence of two subscribing witnesses.

SIEGFRIED HELD.

Witnesses:
   Chas. C. Tillman,
   A. S. Phillips.

---

Copies of this patent may be obtained for five cents each, by addressing the "Commissioner of Patents, Washington, D. C."